United States Patent [19]

Nishida et al.

[11] Patent Number: 4,775,940

[45] Date of Patent: Oct. 4, 1988

[54] PLOWING DEPTH DETECTING SYSTEM FOR ROTARY PLOW

[75] Inventors: Tetsuya Nishida; Toshiya Fukumoto; Shigekazu Hasegawa, all of Sakai; Shouhei Nakai, Izumisano, all of Japan

[73] Assignee: Kubota, Ltd., Osaka, Japan

[21] Appl. No.: 861,844

[22] Filed: May 12, 1986

[30] Foreign Application Priority Data

| Dec. 5, 1985 | [JP] | Japan | 60-273967 |
| Dec. 5, 1985 | [JP] | Japan | 60-273968 |
| Dec. 20, 1985 | [JP] | Japan | 60-288373 |
| Feb. 26, 1986 | [JP] | Japan | 61-40625 |
| Mar. 4, 1986 | [JP] | Japan | 61-46933 |

[51] Int. Cl.$^4$ ............... A01B 63/00; G06F 15/20
[52] U.S. Cl. ............... 364/424.07; 364/562; 364/571.02; 172/4.5
[58] Field of Search ............... 364/424, 561, 562, 571; 56/10.2, DIG. 15; 172/4, 4.5, 26; 73/624, 629, 640

[56] References Cited

U.S. PATENT DOCUMENTS

| 3,786,871 | 1/1974 | Long et al. | 172/4.5 |
| 4,034,490 | 7/1977 | Teach | 172/4.5 |
| 4,273,196 | 6/1981 | Etsusaki et al. | 172/4.5 |
| 4,473,319 | 9/1984 | Spangler | 172/4.5 |
| 4,573,124 | 2/1986 | Seiferling | 364/424 |
| 4,600,997 | 7/1986 | Cain et al. | 364/562 |

FOREIGN PATENT DOCUMENTS 55-56205  4/1980  Japan ............... 172/26

Primary Examiner—Gary Chin
Attorney, Agent, or Firm—Webb, Burden, Ziesenheim & Webb

[57] ABSTRACT

There is disclosed a plowing depth detecting system for a rotary plow adapted to detect an actual plowing depth on the basis of distance data with respect to the ground received from a distance sensor attached to the rotary plow which is vertically movably connected to a vehicle through a link mechanism. The distance sensor provides a microprocessor with distance data with respect to the ground rearwardly of the rotary plow. The microprocessor determines a value of actual plowing depth of the rotary plow on the basis of this distance data and a correction value according to a working condition of the rotary plow.

11 Claims, 4 Drawing Sheets

PLOWING DEPTH DETECTING SYSTEM FOR ROTARY PLOW

BACKGROUND OF THE INVENTION

The present invention relates to a plowing depth detecting system for detecting an actual plowing depth of a rotary plow with respect to the ground plowed by the rotary plow, the system being operable based on distance data relative to the ground measured by sensor means attached to the rotary plow.

A known plowing depth detecting system of the above-described type includes sensor means forwardly or rearwardly of the rotary plow and detects the actual plowing depth based on variations of distance between the sensor means and ground surface. Where the sensor means is mounted forwardly of the rotary plow, the actual plowing depth is detected by measuring a difference between distances to the ground before and after the rotary plow is lowered (that is, by measuring a distance by which the rotary plow is lowered from the ground surface). However, this construction has difficulties in constantly detecting a precise actual plowing depth owing to undulations of the ground, weeds and the like. On the other hand, where the sensor means is mounted rearwardly of the rotary plow, errors in detecting the actual plowing depth occur with rises of the ground surface after plowing and with changes in posture of the sensor means.

SUMMARY OF THE INVENTION

The object of the invention is to provide a plowing depth detecting system for a rotary plow, which is capable of accurately detecting the actual plowing depth by correcting distance data provided by sensor means according to working conditions of the rotary plow.

In one aspect of the present invention a plowing depth detecting system comprises a rotary plow vertically movably connected to a vehicle through a link mechanism and including a rotor for plowing ground; leveling means for leveling the ground plowed by the rotor; sensor means attached to the rotary plow for detecting a distance between the sensor means and the ground rearwardly of the leveling means; and processing means for determining an actual plowing depth of the rotary plow from distance data received from the sensor means and a correction value based on a working condition of the rotary plow.

BRIEF DESCRIPTION OF THE DRAWINGS

The above and other objects and features of the present invention will become apparent from the following description taken in conjunction with the preferred embodiment thereof with reference to the accompanying drawings, in which:-

DETAILED DESCRIPTION OF THE PREFERRED EMBODIMENTS

Figure 1:
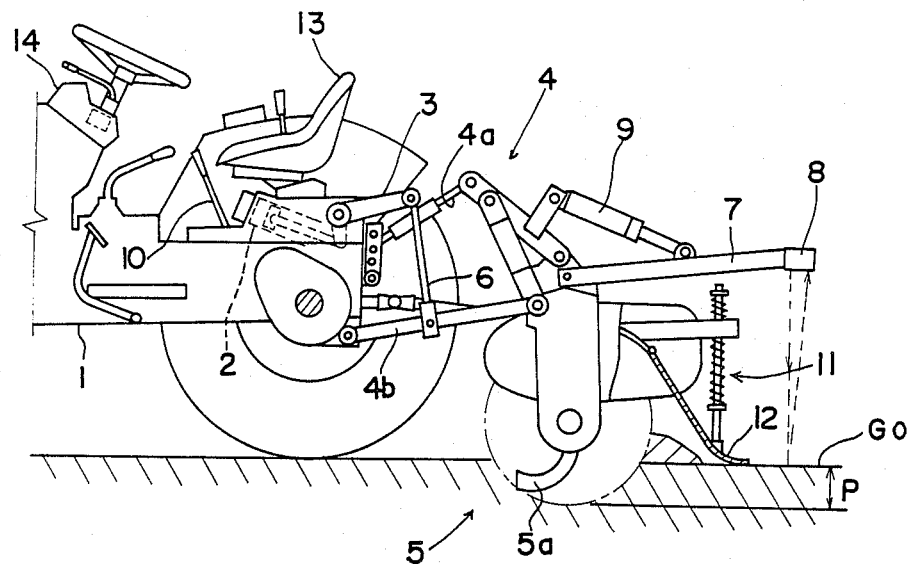
FIG. 1 is a side view of an agricultural tractor standing still with a rotary plow lowered.
Figure 2:
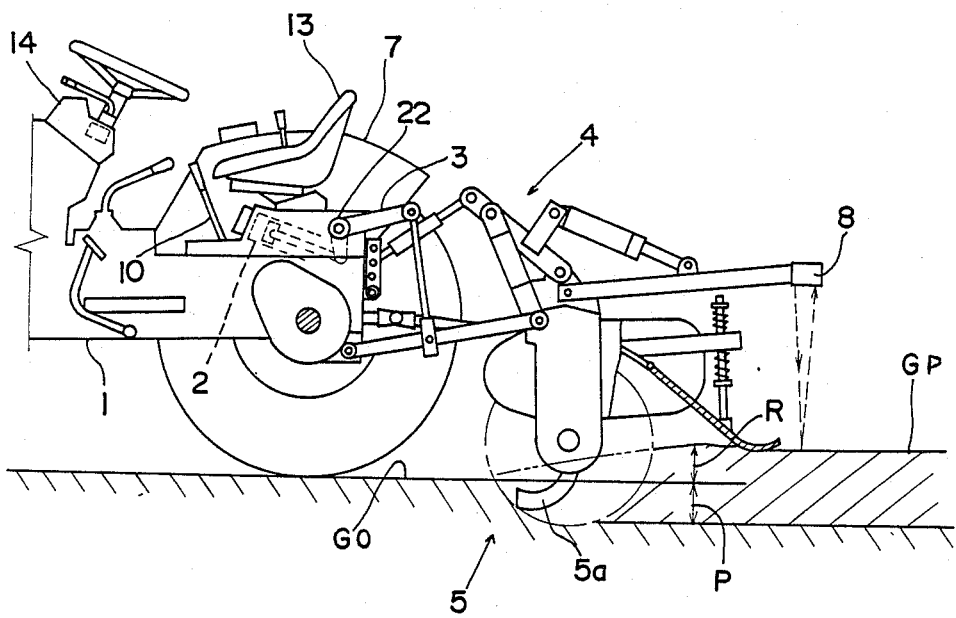
FIG. 2 is a side view of the agricultural tractor engaging in a plowing operation at a selected plowing depth.

Referring to FIG. 1, an agricultural tractor is shown comprising a frame 1 carrying right and left lift arms 3 vertically pivotable by a hydraulic cylinder 2 mounted at a rear portion thereof, and a rotary plow 5 vertically movably connected to the lift arms 3 through a three-point link mechansim 4. The three-point link mechanism 4 includes a top link 4a and two lower links 4b. The lower links 4b are connected to the lift arms 3 through lift rods 6. A ultrasonic distance sensor 8 is mounted on a rear end of a support member 7 pivotally connected to extending rearwardly from the rotary plow 5. The support member 7 is pivotable by a hydraulic cylinder 9 to change its posture. A hand lever 10 is operatively connected to an electromagnetic valve 26 for controlling the hydraulic cylinder 2. This construction constitutes a position control mechanism for vertically moving the rotary plow 5 to a position corresponding to a position to which the hand lever 10 is shifted.

The rotary plow 5 includes a rotor 5a for plowing the ground. A leveling member 12 is pivotally connected to the rotary plow 5 for leveling the ground plowed by the rotor 5a, the leveling member 12 being urged to neutral position by an urging mechanism 11. The distance sensor 8 is located in a position to measure a vertical distance between the position of the sensor 8 and the ground rearwardly of the leveling member 12.

Figure 3:
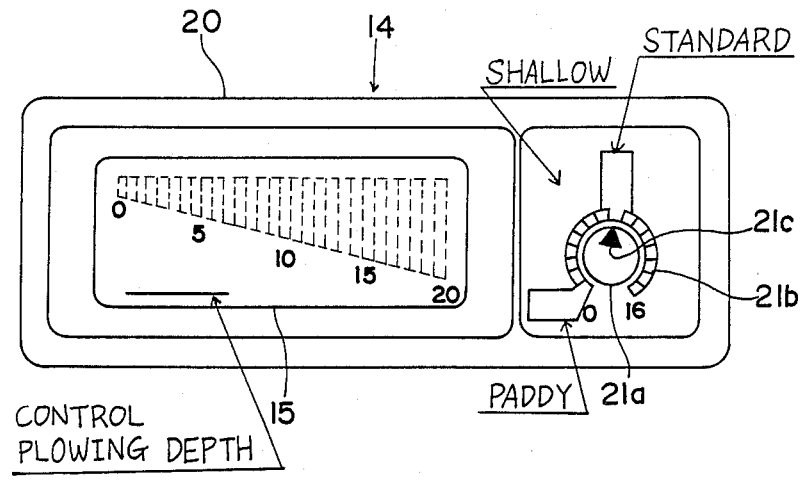
FIG. 3 is a view showing an indicator and a corrector dial.
Figure 4:
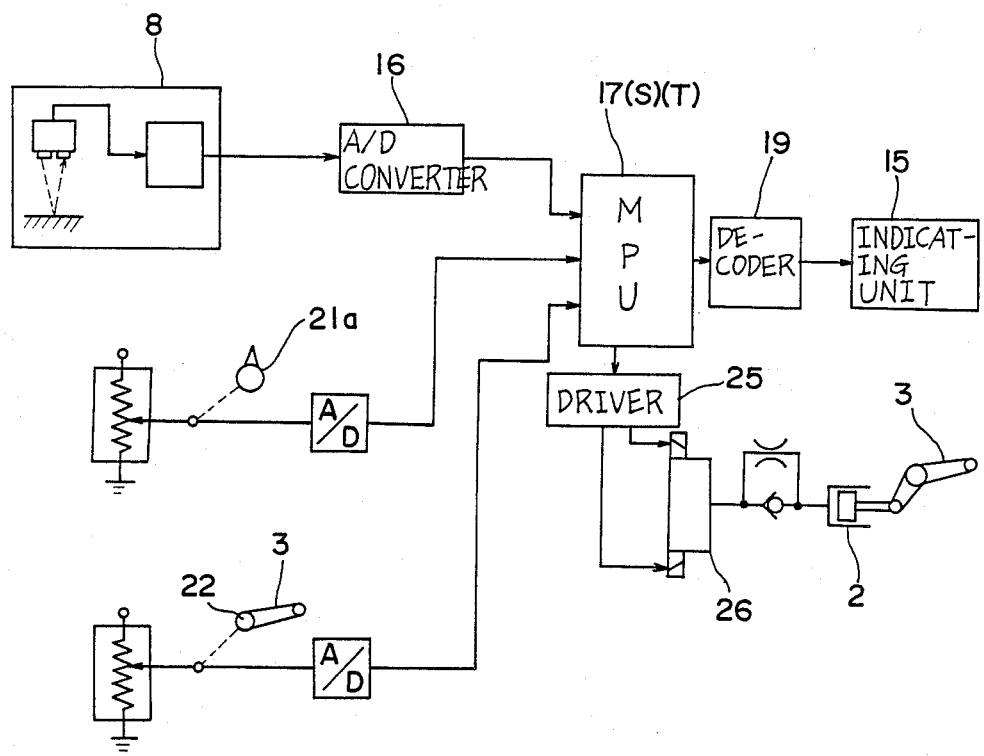
FIG. 4 is a block diagram of a plowing depth detecting system.

A meter panel 14 provided forwardly of a driver's seat 13 includes an indicating unit 15 for indicating an actual plowing depth of the rotary plow 5. As shown in FIG. 3, the indicating unit 15 comprises a liquid crystal indicator having a bar graph to indicate the actual plowing depth, such that the longer bar represents the greater plowing depth.

Signals output by the distance sensor 8 are transmitted through an A/D converter 16 to a microprocessor 17. The microprocessor 17 has an input line for receiving signals from a first switch 18 and an output line for outputting signals to the indicating unit 15 through a decoder 19.

The described construction constitutes a plowing depth detecting system and its operation will be described hereinafter. The rotary plow 5 is lowered while the tractor is standing still, to a level in which a lower end of the rotor 5a contacts the ground. In this state, the microprocessor 17 receives from the distance sensor 8 a reference value corresponding to a unplowed ground G0 rearwardly of the rotary plow 5. The indicating unit 15 is adjusted to show "0" at this time. Then the rotary plow 5 is lowered further by manually operating the lever 10 of the position control mechanism. During the descent, the magnitude of the distance signal periodically transmitted from the distance sensor 8 to the microprocessor 17 gradually reduces with an increasing amount of subsidence (corresponding to the plowing depth) of the rotary plow 5. The microprocessor 17 operates on a deviation from the initial value and sends the deviation to the indicating unit 15, and this deviation is indicated on the panel 14 as representing the plowing depth. The driver of the tractor stops the descent of the rotary plow 5 when the plowing depth indicated reaches a target value. He then turns on the first switch 18, causing the microprocessor 17 to store the target plowing depth, and starts the tractor. While the tractor is running, a plowed ground surface leveled by the leveling member 12 is formed rearwardly of the rotary plow 5. This plowed ground surface is raised by a substantially constant amount R from the unplowed ground GO. Therefore, when a measurement point of the distance sensor 8 comes to the plowed ground surface GP, the measured distance reduces by the amount of rise R and the indicating unit 15 indicate a plowing depth added with the amount of rise R. In order to correct this error the microprocessor 17 is provided with corrector means. This corrector means is required since the distance sensor 8 has not detected any rise R before the tractor begins to plow as illustrated in FIG. 1 and, accordingly, there is an intitial transient portion of R. This transient portion of R is a function of the distance the tractor initially travels increasing at first and then leveling off. Accordingly, this transient disappears and R becomes a constant when the tractor travels a certain distance or travels at a certain speed for a fixed period of time. In operation when the value detected and output by the distance sensor 8 begins to increase rapidly, a timer comes into operation to interrupt the input of the detected value to the microprocessor 17. The input is resumed when a certain period of time lapses and the measurement point of the distance sensor 8 becomes constant for plowed ground surface GP. Upon receipt of a first detection value from the distance sensor 8 corresponding to the plowed ground surface GP, the microprocessor 17 calculates the deviation by subtracting this detection value from the reference value. Since this deviation represents the sum of the target plowing depth value and the amount of rise R, the amount of rise R is derived by subtracting the stored target plowing depth value from the deviation and is stored in the microprocessor 17. Thereafter, the microprocessor 17 receives a detection value from the distance sensor 8, works out a deviation thereof from the reference value, subtracts the amount of rise R stored as the correction value from this deviation, and outputs a resulting value to the indicating unit 15. The indicating unit 15 shows the input value as the actual plowing depth P.

A further embodiment of the plowing depth detecting system will be described next, which is adapted to correct the amount of rise R by using manual corrector means. Referring to FIG. 3, a casing 20 of the indicating unit 15 includes a correcting unit 21 which is one example of the manual corrector means and is operable by a dial 21a. The dial 21a is surrounded by a scale 21b divided for every centimeter from 0 to 16 cms. corresponding to target plowing depths. A correction value (i.e. the amount of rise) is input to the microprocessor 17 by setting a pointer 21c of the dial 21a at a division of the scale 21b corresponding to a desired plowing depth. This scale 21b is determined on the basis of empirical data of the amount of rise R with respect to the target plowing depth obtained in relation with standard or average soil nature.

The correcting unit 21 includes a "0" division of the scale to which the amount of correction is set for an operation in a paddy field in view of the fact that a rise of ground surface GP will not be formed when operating in a paddy field.

In the plowing depth detecting system including this manual corrector means, the vertical distance between the distance sensor 8 and the lower end of the rotor 5a is stored in the microprocessor 17 as the reference value. The operator shifts the lever 10 of the position control mechanism 10 to lower the rotary plow 5 to a position corresponding approximately to the target plowing depth value. The tractor is started after adjustment is effected by means of the dial of the correcting unit 21. The microprocessor 17 subtracts from the reference value a detection value received from the distance sensor 8 and a correction value selected by means of the dial, and outputs a resulting value to the indicating unit 15. The indicating unit 15 shows this value as the actual plowing depth.

The described two corrector means may both be provided along with a changeover switch. Then the plowing depth detection value may be obtained with greater accuracy be utilizing the arithmetic correcting means in the first embodiment for operations on a relatively flat and smooth ground and the manual correcting means for operations on a relatively rough and uneven ground.

Figure 5A:
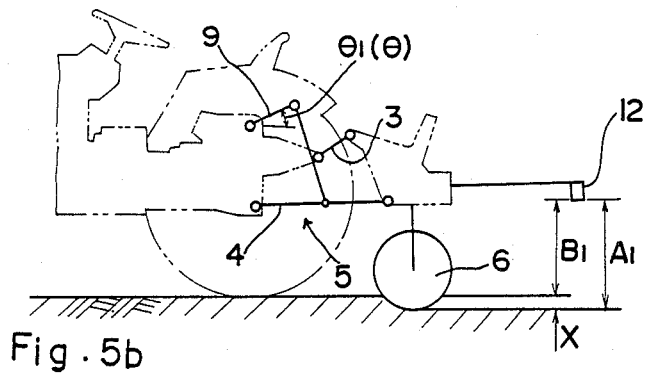
FIG. 5a is a side view showing an operation in a dry field.
Figure 5B:
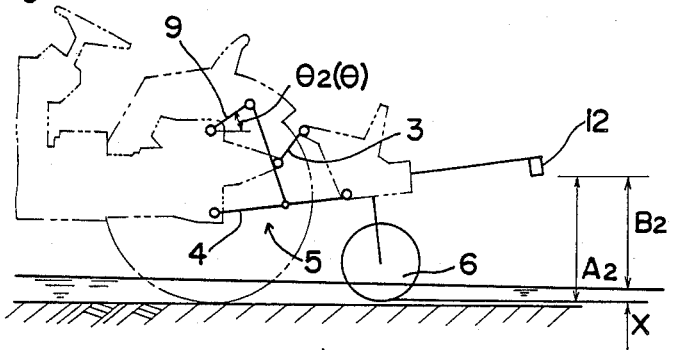
FIG. 5b is a side view showing an operation in a paddy field.
Figure 6A:
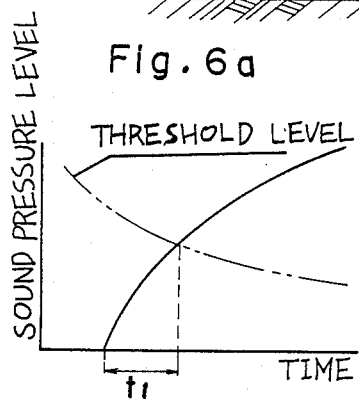
FIG. 6a is a graph showing reception levels of ultrasonic waves corresponding to FIG. 5a, FIG. 6b is a graph showing reception levels of ultrasonic waves corresponding to FIG. 5b.
Figure 6B:
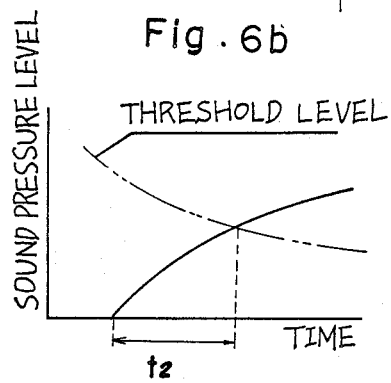
Figure 8:
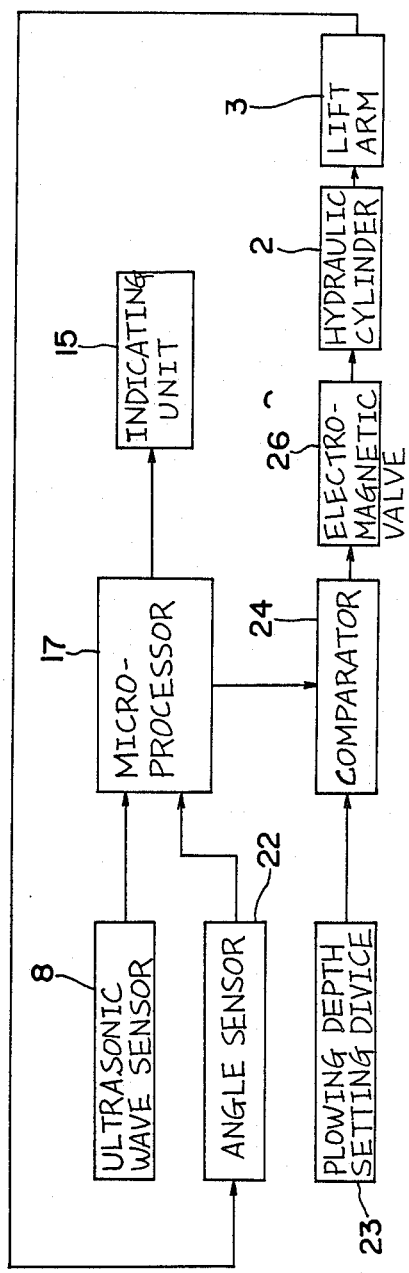
FIG. 8 is a block diagram showing automatic plowing depth control.

While the amount of rise R is considered as the correction value in the foregoing two embodiments, it is necessary to consider a different correction value for a different operational mode. As shown in FIGS. 5a and 5b, for example, there is a difference in the vertical distance (or the shortest distance) from the distance sensor 8 to the lower end of the rotary plow 5 between the case of an operation in a dry field (FIG. 5a) and the case of an operation in a paddy field (FIG. 5b) even if the plowing depth x is the same. This is due to a difference in the posture ($\theta_1$, $\theta_2$) of the link mechanism 4 relative to the tractor frame. Therefore, although the plowing depth is the same, a greater detection value is given from the distance sensor 8 to the microprocessor 17 in the case shown in FIG. 5b than in the case shown in FIG. 5a. As a result, the value shown by the indicating unit 15 is smaller than the actual plowing depth x. Where an ultrasonic sensor is employed as the distance sensor 8, a sound wave reflected from the field surface and traveling by the shortest distance is detected and the distance is measured by converting a time lapse from emission of the sound wave to when the sound pressure level of the received sound wave reaches a predetermined value (i.e. threshold level) as shown in FIGS. 6a and 6b. However, since in the case shown in FIG. 6b the direction of center line for the emission of the sound wave from the ultrasonic sensor varies with a vertical movement of the link mechanism, the sound wave reflected from the ground and traveling by the shortest distance has a low sound pressure level due to the deviation from the center line of emission and it takes time for the sound pressure level to reach the predetermined value. Consequently, the distance is measured to be longer than the actual distance and a value smaller than the actual plowing depth is indicated by the indicating unit 15.

Figure 7:
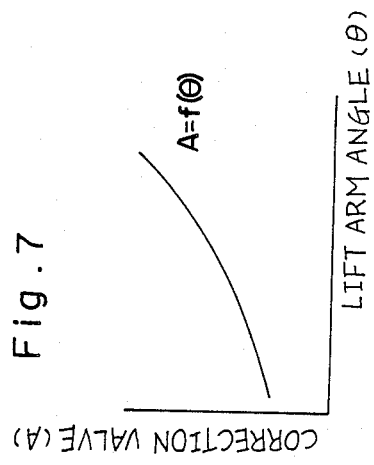
FIG. 7 is a table of angles of oscillation of a lift arm and correction values.

In order to correct this error, an angle sensor 22 for detecting an angle $\theta$ of the lift arms 3 with respect to the tractor frame is provided along with means to converting the angle $\theta$ detected by the angle sensor 22 into a correction value. This converting means converts the angle $\theta$ input from the angle sensor 22 into the correction value on the basis of data in a table stored in the microprocessor memory. As shown in FIG. 7, this table shows the correction value as a function of the detected angle θ, and the correction value corresponds to a distance converted beforehand from an amount of relative movement of the distance sensor based on the detected angle θ and/or an amount of response delay due to a variation of the ultrasonic sensor 8 with respect to the direction of center line for emission. For a plowing operation in a paddy field which requires such correction means, the dial 21a of the correcting unit 21 is set at the "0" division since raised ground surfaces are not formed. Therefore, while the tractor is running, the microprocessor 17 subtracts from the reference value the value detected by the distance sensor 8 and the correction value provided by the converting means and outputs a resulting value to the indicating unit 15. The indicating unit 15 shows this value as the actual plowing depth. Where automatic plowing depth control is effected on the basis of the actual plowing depth detected by the above plowing depth detecting system, a changeover switch for starting and stopping the automatic plowing depth control, a setter switch for setting a plowing depth value, a plowing depth setting device 23 and comparator means 24 are provided in addition to the elements constituting the plowing depth detecting system. When the changeover switch is turned off and the automatic control is stopped, the operator effects the plowing depth control by means of the hand lever 10 while observing the value indicated by the indicating unit 15. He turns on the setter switch when the indicated value reaches a desired value, whereby this value is set to the plowing depth setting device 23 as a selected value of plowing depth. When the changeover switch is thereafter turned on for the automatic control operation, the microprocessor 17 compares the actual plowing depth value and the selected plowing depth value and derives a deviation. A signal comprising this value and a control gain is transmitted through a driver 25 to the electromagnetic value 26 for operating the hydraulic cylinder 2. In response to the input signal the electromagnetic valve operates the hydraulic cylinder 2 to raise or lower the rotary plow 5 thereby to maintain the actual plowing depth to the selected plowing depth.

What is claimed is:

1. A plowing depth detecting system comprising;
   a rotary plow vertically movably connected to a vehicle through a link mechanism and including a rotor for plowing ground,
   leveling means for leveling the ground plowed by said rotor,
   sensor means attached to said rotary plow for detecting a distance between said sensor means and the ground rearwardly of said leveling means, and
   processing means including;
   calculator means for calculating an amount of rise of the plowed ground leveled by said leveling means as compared with an unplowed ground,
   corrector means for determining a plowing depth correction value from said amount of rise of the plowed ground that is determined by said calculator means, and
   actual plowing depth determining means for determining an actual plowing depth of said rotary plow from distance data provided by said sensor means and said plowing depth correction value.

2. A system as claimed in claim 1 wherein said calculator means calculates said amount of rise by subtracting a distance to the plowed and leveled ground detected by said sensor means after a run of said vehicle from a distance to the unplowed ground detected by said sensor means when said rotary plow is lowered to a target plowing depth prior to the start of said vehicle.

3. A system as claimed in claim 2 wherein said calculator means takes in said distance to the plowed and leveled ground from said sensor means only after lapse of a predetermined time from the start of said vehicle.

4. A system as claimed in claim 1 wherein said actual plowing depth determined by said processing means is displayed by display means.

5. A system as claimed in claim 1 further comprising an angle detecting sensor for detecting an angle of oscillation of a lift arm of said link mechanism for vertically moving said rotary plow, wherein said corrector means corrects said amount of rise based on said angle of oscillation and determines the plowing depth correction value.

6. A system as claimed in claim 5 wherein said corrector means includes converter means for converting said angle of oscillation into a correction distance.

7. A system as claimed in claim 6 wherein said converter means derives the correction distance from a prestored table of angles of oscillation and correction distances corresponding thereto.

8. A plowing depth detecting system comprising;
   a rotary plow vertically movably connected to a vehicle through a link mechanisw and including a rotor for plowing ground,
   leveling means for leveling the ground plowed by said rotor,
   sensor means attached to said rotary plow for detecting a distance between said sensor means and the ground rearwardly of said leveling means,
   manual input means for manually inputting an expected amount of rise of the plowed ground leveled by said leveling means as compared an unplowed ground, and processing means including;
   corrector means for determining a plowing depth correction value from said amount of rise input from said manual input means, and
   actual plowing depth determining means for determining an actual plowing depth of said rotary plow from distance data provided by said sensor means and said plowing depth correction value.

9. A system as claimed in claim 8 wherein said actual plowing depth determining means determines the actual plowing depth by subtracting a sum of said plowing depth correction value and a distance to the plowed and leveled ground detected by said sensor means from a predetermined distance from said sensor means to a lower end of said rotor.

10. A system as claimed in claim 9 wherein said manual input means comprises manually operable dial adjusting means.

11. A plowing depth detecting system comprising;
   a rotary plow vertically movably connected to a vehicle through a link mechanism and including a rotor for plowing ground,
   leveling means for leveling the ground plowed by said rotor,
   sensor means attached to said rotary plow for detecting a distance between said sensor means and the ground rearwardly of said leveling means,
   manual input means for manually inputting an expected amount of rise of the plowed ground leveled by said leveling means as compared with an unplowed ground, and processing means including;

calculator means for calculating an amount of rise of the plowed ground leveled by said leveling means as compared with the unplowed ground, selector means for selecting either of said amount of rise input from said manual input means or said amount of rise calculated by said calculator means, for use in determining a plowing depth correction value, corrector means for determining the plowing depth correction value from said amount of rise selected by said selector means, and actual plowing depth determining means for determining an actual plowing depth of said rotary plow from distance data provided by said sensor means and said plowing depth correction value.

* * * * *